United States Patent
Feng et al.

(10) Patent No.: US 7,165,072 B2
(45) Date of Patent: Jan. 16, 2007

(54) METHOD FOR MERGING INFORMATION FROM EFFECTIVE DATED BASE TABLES

(75) Inventors: Yao-Chia Feng, HsinChu (TW); Chan-Yen Teng, Kuala Lumpur (MY)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 334 days.

(21) Appl. No.: 10/397,453

(22) Filed: Mar. 26, 2003

(65) Prior Publication Data

US 2004/0193565 A1 Sep. 30, 2004

(51) Int. Cl.
*G06F 17/00* (2006.01)
*G06F 17/30* (2006.01)

(52) U.S. Cl. .................. 707/101; 707/1; 707/2

(58) Field of Classification Search .......... 707/1, 707/2, 100, 101; 700/91, 95; 705/7, 11, 705/35
See application file for complete search history.

(56) References Cited

U.S. PATENT DOCUMENTS

| | | | | |
|---|---|---|---|---|
| 5,515,490 A | * | 5/1996 | Buchanan et al. | 715/500.1 |
| 6,292,830 B1 | * | 9/2001 | Taylor et al. | 709/224 |
| 6,463,439 B1 | * | 10/2002 | Dahlberg | 707/100 |
| 2003/0014139 A1 | * | 1/2003 | Yokomori et al. | 700/96 |
| 2003/0014335 A1 | * | 1/2003 | Lecheler-Moore et al. | 705/30 |
| 2004/0059651 A1 | * | 3/2004 | MaGuire et al. | 705/30 |

* cited by examiner

*Primary Examiner*—Uyen Le
(74) *Attorney, Agent, or Firm*—Slater & Matsil, L.L.P.

(57) ABSTRACT

Method for merging data entries from a plurality of effective-dated tables. A preferred embodiment comprises converting the data entries from an effective-dated table into a continuous duration data table (for example, algorithm block 405) and then merging continuous neighbors that contain repetitive data (for example, algorithm block 415). Finally, data from other effective-dated tables are used to split the continuous duration data into parts (for example, algorithm block 425) so that associations between the continuous duration data and the data from the other effective-dated tables are made clear.

23 Claims, 8 Drawing Sheets

METHOD FOR MERGING INFORMATION FROM EFFECTIVE DATED BASE TABLES

TECHNICAL FIELD

The present invention relates generally to a system and method computer databases, and more particularly to a system and method for readily merging information from base tables that are indexed by effective date, making it simpler to extract the information.

BACKGROUND

Generally, database management systems store information in a highly organized manner. The information is stored in tables which represent groups of related data. The tables may be indexed (referenced) by one or more indices. These indices permit the database application to rapidly search for and access the information stored in the tables. In many databases, a single entity can have several different tables of data which may or may not be indexed by the same index. For example, in a human resources database, each employee can have a table that stores employee information (such as start date, leaves of absence (LOA), grade changes, department changes, etc.) and a table that stores department information for the employee (this can include the departments that the employee has been a member of, department identifiers, department descriptions, etc.). These two tables, which are used to store information for a single entity (for example, an employee) are often indexed using the effective date. Examples of the effective date may be the date of hire of the employee or the date of a promotion, etc.

When data related to a single entity is spread out across multiple tables, it can become difficult to merge all of the information regarding that entity and then produce a meaningful report about the entity without needing to perform a great deal of processing. In the human resources database above, for example, with the employee information and department information spread across two tables, it can be difficult to produce a report that would reflect the entities organizational changes over time. Additionally, some personal information, such as termination/hire, leave of absence, etc., may be hard to exclude.

Post processing can eliminate data that is to be excluded. For example, the data can be searched for instances related to termination, hire, leave of absence, etc., and these instances can be removed from a report prior to the report being produced in final form. Additionally, post processing can be used to provide information from other tables.

While additional processing (either by computer or by hand) can be used to provide (or exclude) the information, it would be more efficient if the information can be extracted from the tables without needing any post processing from man or machine.

One disadvantage of the prior art is that post processing is inefficient and requires additional processing steps by either man or machine to produce the desired information. This can greatly increase the amount of time and costs needed to produce reports.

A second disadvantage of the prior art is that data that is spread across multiple tables, but indexed by the same index is generally not easily combined and extracted without requiring (again) post processing.

SUMMARY OF THE INVENTION

These and other problems are generally solved or circumvented, and technical advantages are generally achieved, by preferred embodiments of the present invention which provide a method for creating continuous duration data from effective-dated tables that are spread across multiple tables.

In accordance with a preferred embodiment of the present invention, a method for merging data entries comprising converting data entries from a first table into continuous duration data, merging adjacent continuous duration data entries if they contain similar data, and creating an association between a continuous duration data entry and a data entry in a second table if the data entry has an effective date within a time spanned by the continuous duration data entry.

In accordance with another preferred embodiment of the present invention, a method for extracting data from effective-dated tables comprising converting data entries from a first table into continuous duration data, merging adjacent continuous duration data entries if they contain similar data, creating an association between a continuous duration data entry and a data entry in a second table if the data entry has an effective date within a time spanned by the continuous duration data entry, searching the continuous duration data for a particular data entry received in a query, and providing a continuous duration data entry corresponding to the particular data entry if found.

An advantage of a preferred embodiment of the present invention is that information from multiple effective-dated tables can be combined for use in reports without requiring the use of inefficient post processing by man or machine.

A further advantage of a preferred embodiment of the present invention is that certain information that are part of the effective-dated tables can be excluded easily (and usually during the merging process) without requiring additional processing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a method for merging effective-dated data related to employees in a human resources database into a continuous duration data, wherein the data are stored in multiple effective-dated tables. The invention may also be applied, however, to other database applications such as bill-of-materials (BOM) databases and document revision history databases, in general, other databases that make use of effective-dating as an index to the data.

Figure 1:
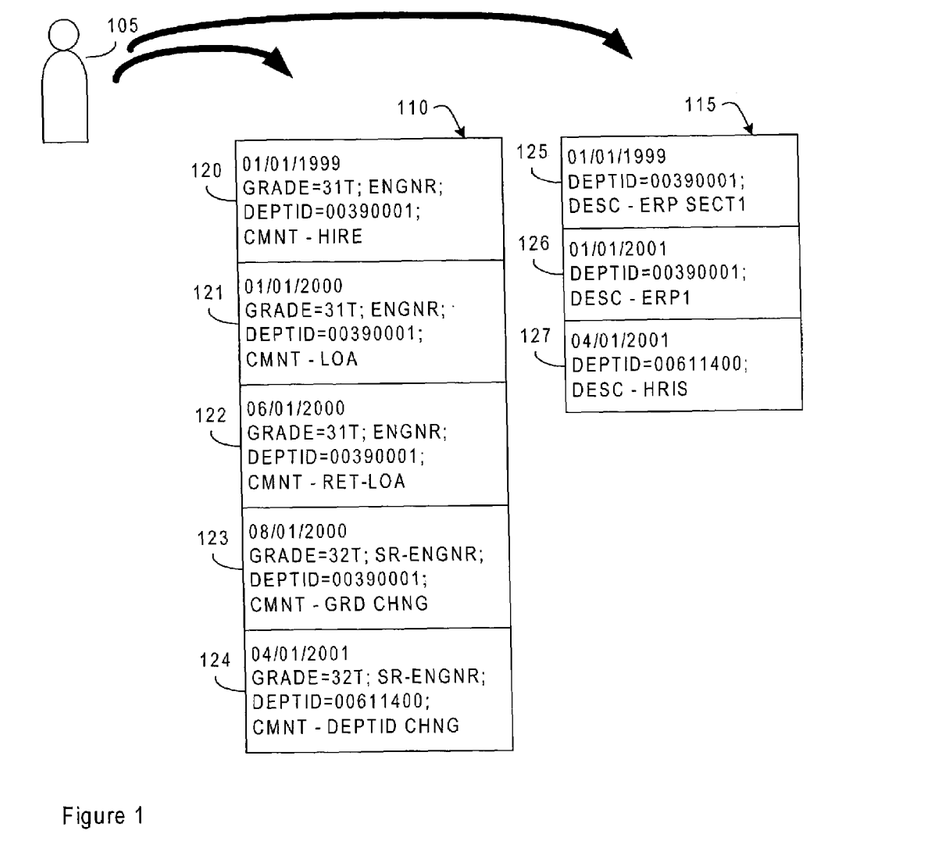
FIG. 1 is a diagram of an entity and two data tables of data related to that entity.

With reference now to FIG. 1, there is shown an entity (in this case, an employee 105 of a company) and two data tables 110 and 115 for the employee 105 that contains data related to the employee. The first table 110 contains information related to the employee's grade, title, department, etc. The first table 110 is sometimes referred to as an employee table and is indexed by an effective date. For example, an entry 120 in the employee table 110 contains information related to the employee's initial hiring by the company. The entry 120 shows that the employee 105 was hired on Jan. 1, 1999 with a grade of 31T and a title of Engineer. The employee 105 works for department 00390001. The employee's date of hire (01/01/1999) also functions as the entry's effective-date.

The second table 115 contains information related to the employee's department and is commonly referred to as a department table. The department table 115 is also indexed by an effective date. For example, an entry 125 (which happens to correspond to the employee's initial hiring) shows that the employee works for department 00390001 which has the description ERP Section1. Since the entry 125 corresponds to the employee's initial hiring, the entry 125 is dated Jan. 1, 1999, which is also its effective date.

The two tables (110 and 115) can be used in conjunction by first accessing the employee table 110 and then using the department identifier from an entry in the employee table to access an entry in the department table 115. For example, from the entry 120, the department identifier 00390001 can be used to access the data in either entry 125 or 126 in the department table 115. Note however, that the entry 126 has an effective date of Jan. 1, 2001, therefore should not contain any information that is pertinence to (or related to) the entry 120 (which has an effective date of Jan. 1, 1999). The example illustrates how data from one entry of one table can be used to access data stored in another entry in another table. Also shown, however, is the importance of checking the relevance of the data in the related tables.

Figure 2:
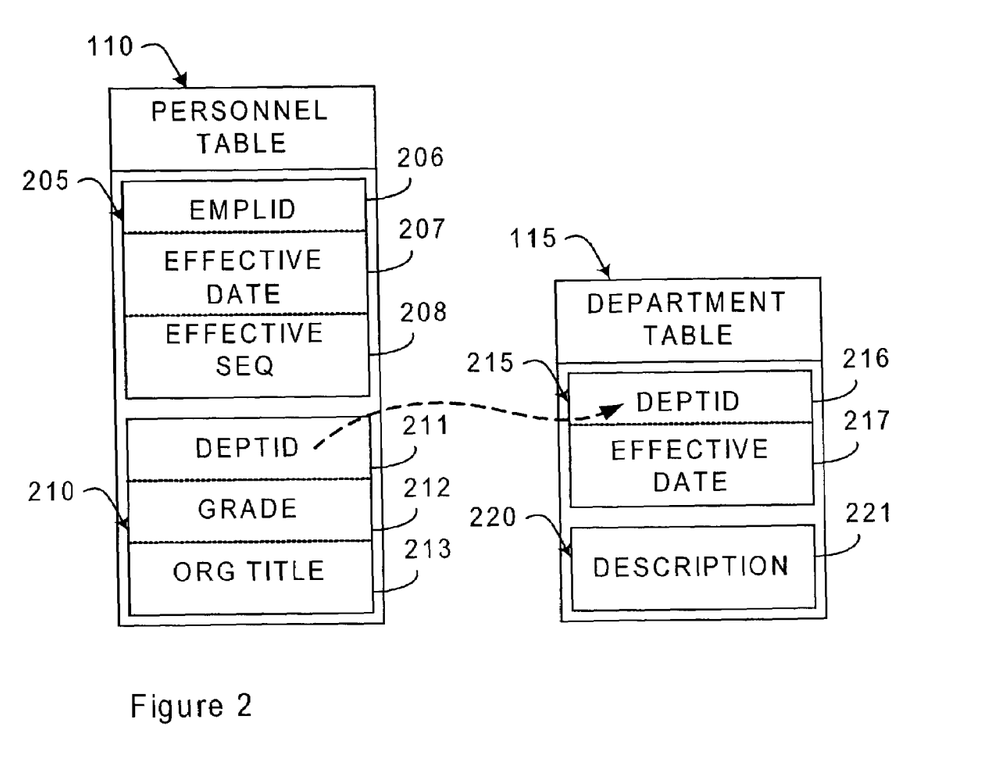
FIG. 2 is a diagram of the structure of two data tables for a single entity, according to a preferred embodiment of the present invention.

With reference now to FIG. 2, there is shown a diagram illustrating the structure of an entry in the personnel table 110 (FIG. 1) and the department table 115 (FIG. 1), according to a preferred embodiment of the present invention. A group 205 of fields in an entry in the personnel table 110, referred to as a primary key (PK), contains an employee identifier field 206, effective date field 207, and effective sequence field 208. Also included in the entry in the personnel table are fields containing department identifier 211, grade 212, and organization title 213. These three fields are not key fields and may be grouped together in a second group 210.

The department table 115 contains also contains fields that can be broken up into one of two distinct groups. A first group 215 contains fields that can be used as keys and is again referred to as a primary key (PK) (similar to the key fields in the personnel table 110 discussed above). The fields in the first group 215 may include a department identifier field 216 and an effective date field 217. A second group 220 includes fields that are not used as key fields and include a description field 221.

Note that the structure of the personnel and department tables 110 and 115 as displayed in FIG. 2 and discussed above serve as examples of a possible structure of the two tables and that the actual implemented structure of the two tables 110 and 115 may be different from what is illustrated and the present invention would remain operable. For example, additional key and/or non-key fields may be added to either (or both) of the tables 110 and 115. Alternatively, certain fields that are illustrated may be eliminated.

Figure 3:
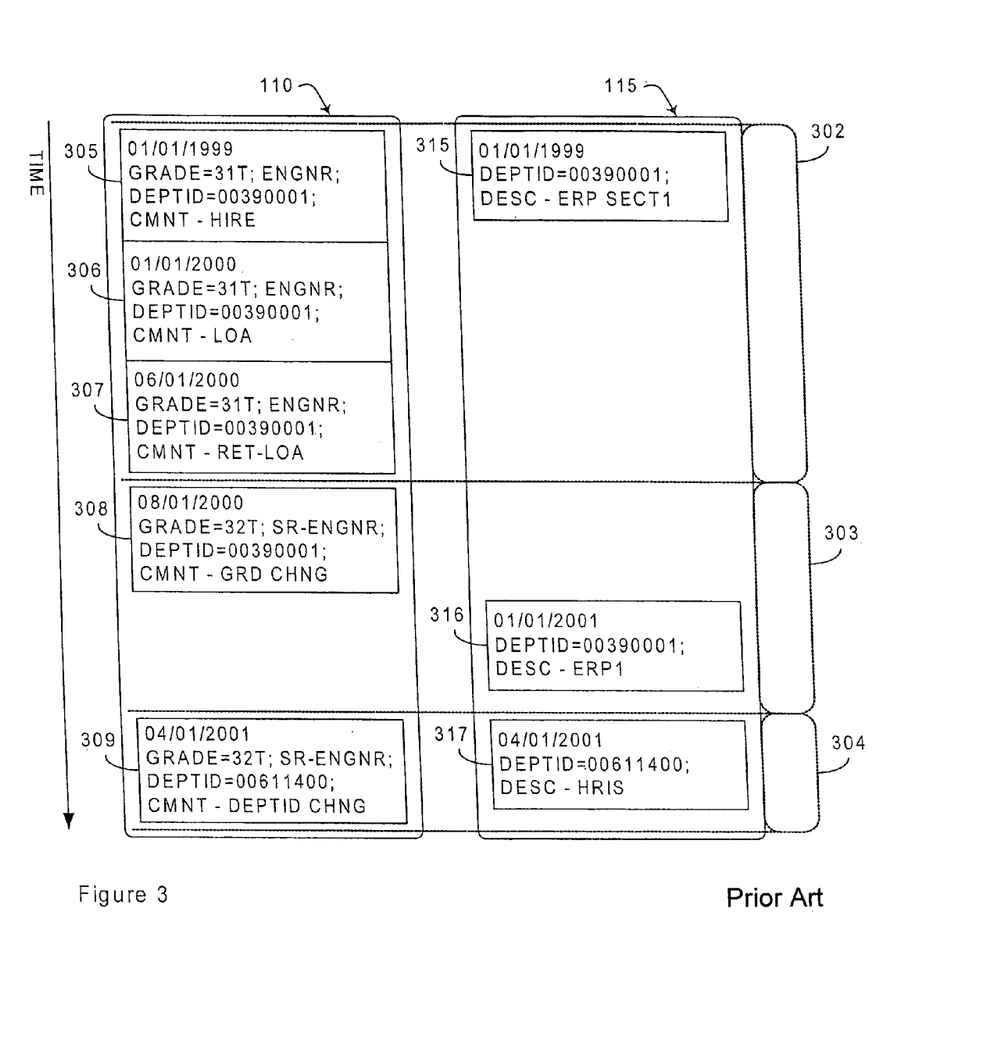
FIG. 3 is a diagram of the merging of two data tables which contains data for a single entity, using a prior art process.

With reference now to FIG. 3, there is shown a diagram illustrating the merging of information from two effective-dated tables containing related data using solely an index of the tables (namely the effective date). For illustrative purposes, the two effective-date tables are the two tables: personnel table 110 and department table 115 illustrated in FIG. 1. As illustrated, the tables 110 and 115 are displayed as dashed boxes and the data entries within the tables 110 and 115 are displayed as solid boxes with text. Note that other tables that are indexed by the effective date and containing related data can be use in place of the personnel and department tables.

FIG. 3 illustrates the data in the tables 110 and 115 being listed in chronological order (with time increasing in a downward direction) and partitioned based on changes that occurred in the data stored in the tables, using a prior art process. For example, for the data that is displayed in FIG. 3, the personnel table 110 may be partitioned into three distinct groups. A first group (displayed as a rounded shape 302) contains data entries 305, 306, and 307. While a second group (displayed as a rounded shape 303) contains data entry 308 and a third group (displayed as a rounded shape 304) contains data entry 309. Note that while the group indicators (shapes 302, 303, and 304) are adjacent to the table 115, the groupings are applicable to the data entries in the table 110.

The groupings, themselves, are based on changes in the data stored in the data entries. For example, the first group 302 contains data entries that contain the same information (with exception of the effective date) concerning an employee's grade, organization title, and department identifier. Data entry 308 is not grouped in the first group 302 since the employee's grade and organization title is different from each of the same fields from the data entries 305, 306, and 307. Similarly, data entry 309 contains a department identifier field that is different from the data entry 308, hence, it is placed in another group (group 303). Note that a change in the comment field does not necessarily result in the differentiation of the data entries.

In addition to displaying the data entries of the personnel table 110 being placed into groups depending on the contents of the data entries, FIG. 3 also displays the data entries of the department table 115 being placed into another set of groups. A data entry 315 is placed into a group that corresponds to the first group 302 containing data entries 305, 306, and 307 from the personnel table 110, while a data entry 316 is placed into a group that corresponds to the second group 303 containing data entry 308 from the personnel table 110 and yet another group contains a data entry 317. Note that while the data entries from the department table 115 are placed into separate groups that correspond to the groups of the data entries from the personnel table 110, the same group indicators are used for both tables. Note also that the effective date for the data entries from the department table lay within an interval specified by the effective dates contained in the corresponding groups for data entries from the personnel table 110.

For example, the first grouping contains data entries from the personnel table 110 with effective dates from 01/01/1999 to 06/01/2000. The data entries 315 and 316 from the department table both contain department identifier fields with data that could correspond to data entries within the first grouping 302. However, the effective date of the data entry 316 is 01/01/2001, which lies outside of the time span of the data entries in the first grouping 302. Therefore, the data entry 316 should not be included in the grouping of data entries from the department table 115 that corresponds to the first grouping 302.

Note that although the data entries from the two tables 110 and 115 are partitioned into groups that are delineated by the data contained in the data entries, it can remain unclear as to which data entries should be associated with which. For example, the data entry 315 from the department table 115 can be associated with one of the three data entries 305, 306, and 307 from the first grouping 302. However, upon inspection of its effective date (01/01/1999), it is clear that the data entry 315 should be associated with the data entry 305. Note that the inspection is an additional step that is performed after the processing. This post processing step can be done either by man or machine and would add overhead to the process, possibly making the process less efficient and more costly.

Figure 4:
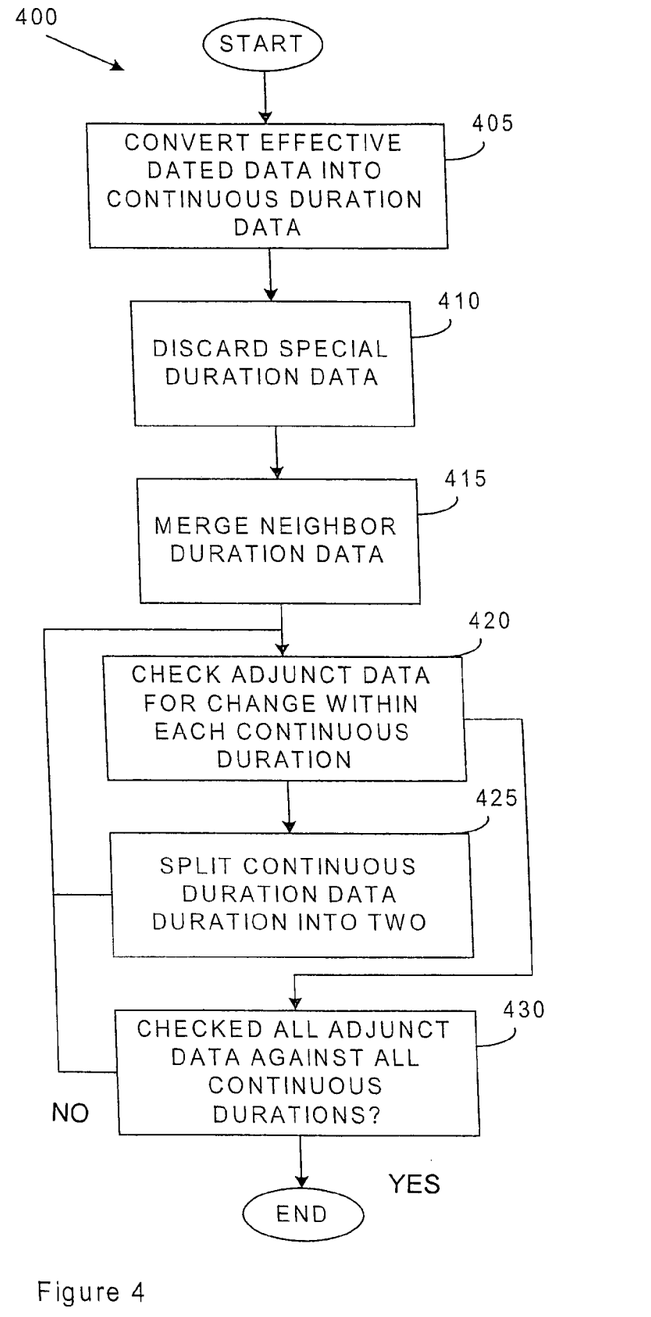
FIG. 4 is a flow diagram of an algorithm used to merge information from a plurality of effective-dated tables.

With reference now to FIG. 4, there is shown a flow diagram illustrating an algorithm 400 for use in merging information from a plurality of effective-dated tables, according to a preferred embodiment of the present invention. The algorithm 400 describes the process that may be used to combine data from a plurality of effective-dated tables in such a way that after partitioning of the data, associations between data from different tables are clear. For example, continuing with the human resources example, after the process described in the algorithm 400 has been applied to the two tables 110 and 115 (FIG. 1), data entries from the department table 115 will be properly associated with data from data entries in the personnel table 110 and there is no longer any confusion as to the relationships between data between tables, as can be the case when the earlier described prior art technique (FIG. 3) is used.

According to a preferred embodiment of the present invention, the algorithm 400 can be executed within a database application which itself may be executing on a computer. The algorithm 400 can be executed each time a particular query regarding any of the plurality of effective-dated tables is encountered. Alternatively, the algorithm 400 can be executed once to generate the data from the effective-dated tables (which is then saved) and then re-executed each time a data entry in one or more of the effective-dated tables is changed.

The database application starts by converting the effective-dated data into continuous duration data (block 405). As noted previously, the effective-dated data is analogous to samples of the continuous time stream. To convert the effective-dated data entries into continuous duration data entries, the database application does the following: for each effective-dated data entry, create a corresponding continuous duration data entry with a start date and a stop date that is dependent upon the effective date of the effective date data entry and then store any remaining data from the effective-dated data entry into the continuous duration data entry, preferably unmodified. The start date preferably corresponds to the effective date of the effective-dated data entry, while the stop date is the effective date of the next effective-dated data entry or if the particular piece of effective-dated data is the final piece of effective-dated data in the table, then the current date.

Figure 5:
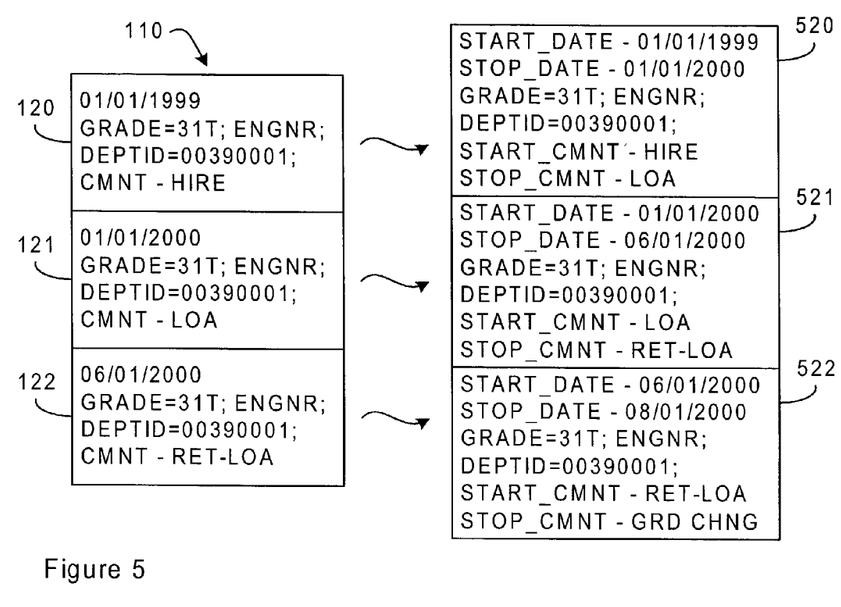
FIG. 5 is a diagram of a conversion of several effective-dated data entries into continuous time data entries, according to a preferred embodiment of the present invention.

With reference now to FIG. 5, there is shown a figure illustrating a conversion of several effective-dated data entries to continuous duration data entries, according to a preferred embodiment of the present invention. As an example, data entries 120, 121, and 122 of the personnel table 110 from FIG. 1 are to be converted into continuous duration data entries. Data entry 120 has an effective date of 01/01/1999, therefore, a first continuous duration data entry 520 that corresponds to the data entry 120 has a start date of 01/01/1999. The next data entry (data entry 121) has an effective date of 01/01/2000. This will then make the stop date of the first continuous duration data entry 520 be 01/01/2000. In a similar way, the continuous duration data with the start comment and end comment from data entries 120 and 121. The remainder of the first continuous duration data entry contains the same data that is present in the data entry 120. A second and third continuous duration data entries 521 and 522 are continuous duration conversions of data entries 121 and 122 and a subsequent data entry that is not shown.

With reference back to FIG. 4, after converting all of the effective-dated data entries in a first data table (for example, the personnel table 110 (FIG. 1)) into continuous duration data entries in block 405, the database application continues by discarding any special duration data that may be present in the continuous data (block 410). In this step, the database application searches through the continuous duration data and deletes data entries that contain data that is deemed not relevant. Note that this step may be an optional step depending on whether or not there is any data that has been deemed to being irrelevant. The database application can simply parse through the start/end comments of the continuous duration data and eliminates data entries containing the irrelevant data. Data entry 521 is eliminated because of the duration data comments are leaves of absence and return from leaves of absence. Examples of data that can be eliminated in the human resources database example include dates of termination and hire and dates of leaves of absence and return from leaves of absence.

After eliminating any special duration data entries and adjusting (if necessary) the start and stop time of remaining data entries to compensate for the eliminated duration data entries, the database application parses through the continuous data entries to merge contiguous neighboring duration data (block 415). In order to merge two (or more) continuous data entries into one continuous duration data entry, the data entries should be adjacent to one another, i.e., the data entries are sequential in time. The data entries should also contain essentially the same data as far as the relevant fields are concerned. Note that the non-relevant fields can differ, only the relevant fields of the adjacent data entries should be the same. When the adjacent data entries are merged, the merged data entry has a start date of the data entry with an earlier start date and a stop date of the data entry with the later stop date.

After merging any continuous duration data with the same relevant data, the database application begins a recursive process for combining data entries from a related table(s) with the continuous duration data entries. According to a preferred embodiment of the present invention, an iterative process for combining data entries into the continuous duration data entries is also operable. The database application checks, for each continuous duration data entry (block 420), if there is a data entry in the related table(s) with an effective date that lies within a time span in the continuous duration data. The database application checks the effective date of the data entry in the related table against the start and stop dates of the continuous duration data entry. If the effective date lies within the start/stop dates and the department description is changed, the database application will split the continuous duration data entry into two (block 425), with the effective date of the data entry in the related table being the stop date of a first of two split continuous duration data and the start date of a second of two split continuous duration data.

Figure 6:
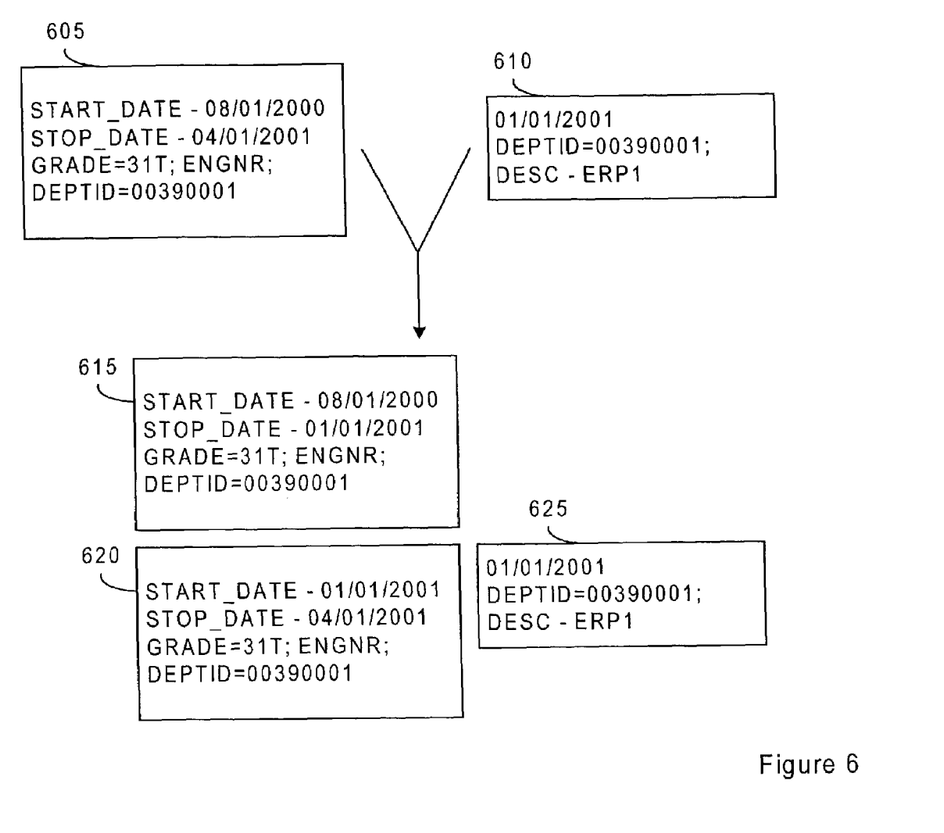
FIG. 6 is a diagram of a splitting of a continuous duration data entry into two continuous duration data entries due to a data entry in a related table with an effective date lying within a time span specified by the continuous duration data entry, according to a preferred embodiment of the present invention.

With reference now to FIG. 6, there is shown a figure illustrating an exemplary splitting of a continuous duration data entry 605 into two due to a data entry 610 in a related table with an effective date lying within a time span specified in the continuous duration data, according to a preferred embodiment of the present invention. The continuous duration data entry 605 spans a time duration of 08/01/2000 to 04/01/2001 while the data entry 610 has an effective date of 01/01/2001. Clearly, the data entry 610 occurs within the time covered by the continuous duration data entry 605. Therefore, the database application will split the continuous duration data entry 605 into two data entries (a first continuous duration data entry 615 and a second continuous duration data entry 620). The first continuous duration data entry 615 has a stop date that is equal to the effective date of the data entry 610 (01/01/2001) while the second continuous duration data entry 620 has a start date that is equal to the effective date of the data entry 610. The start date of the first continuous duration data entry 615 and the stop date of the second continuous duration data entry 620 are carried over from the continuous duration data entry 605 when it was split. Note that the data entry 610 may remain unchanged by the database application.

With reference back to FIG. 4, after splitting the continuous duration data entry into two, the database application returns to block 420 to check for any additional continuous duration data entries that need to be split due to data entries from a related table(s). Because the algorithm 400 uses recursion to split the continuous duration data entries, the split continuous duration data entries are placed into a list of continuous duration data entries that remain to be processed. The database application will continue until it has exhausted all data entries from the related table(s).

Figure 7:
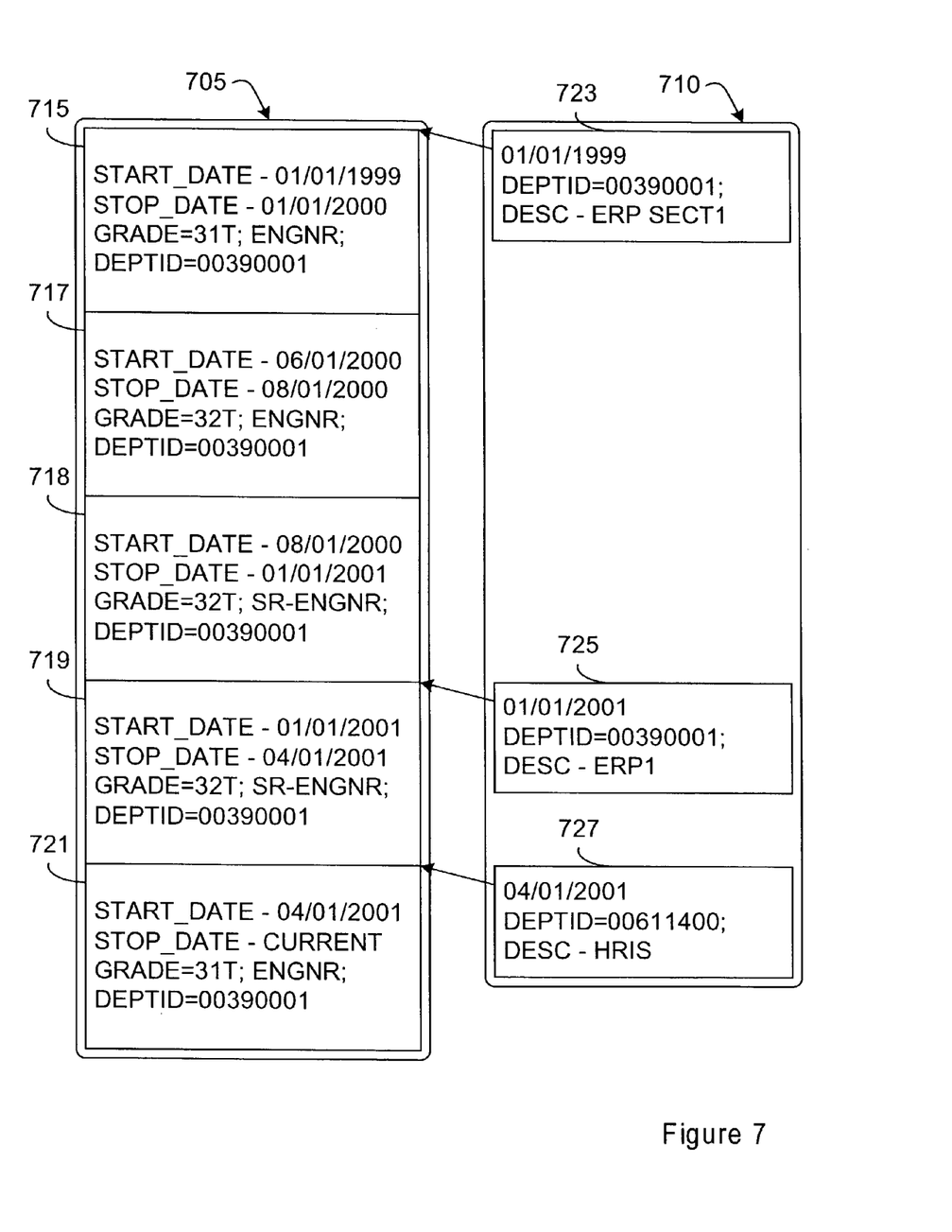
FIG. 7 is a diagram of effective-dated data tables after an application has applied an algorithm for merging information from a plurality of effective-dated tables, according to a preferred embodiment of the present invention.

With reference now to FIG. 7, there is shown a diagram illustrating a pair of effective-dated data tables 705 and 710 after a database application has applied an algorithm for merging information from a plurality of effective-dated tables, according to a preferred embodiment of the present invention. As a starting point, the database application began with data entries as displayed in tables 110 and 115 of FIG. 1. After the database application has converted the effective-dated data entries from table 110 into continuous duration data, discarded special duration data, merged neighboring duration data, and split any continuous duration data due to data entries from the related table (table 115), the end result is as displayed in FIG. 7.

Data entries 120, 121, and 122 (FIG. 1) were initially converted into continuous duration data entries and then subsequently, continuous duration data entries related to data entries 121 and 121 were eliminated because they contained special duration data to produce continuous data entry 521. Data entries 123 and 124 were converted into continuous duration entries, but they were not eliminated nor merged because they did not contain special duration data. A continuous duration data entry corresponding to data entry 123 was split into entries 718 and 719 due to a data entry 725 from the table 710.

Figure 8:
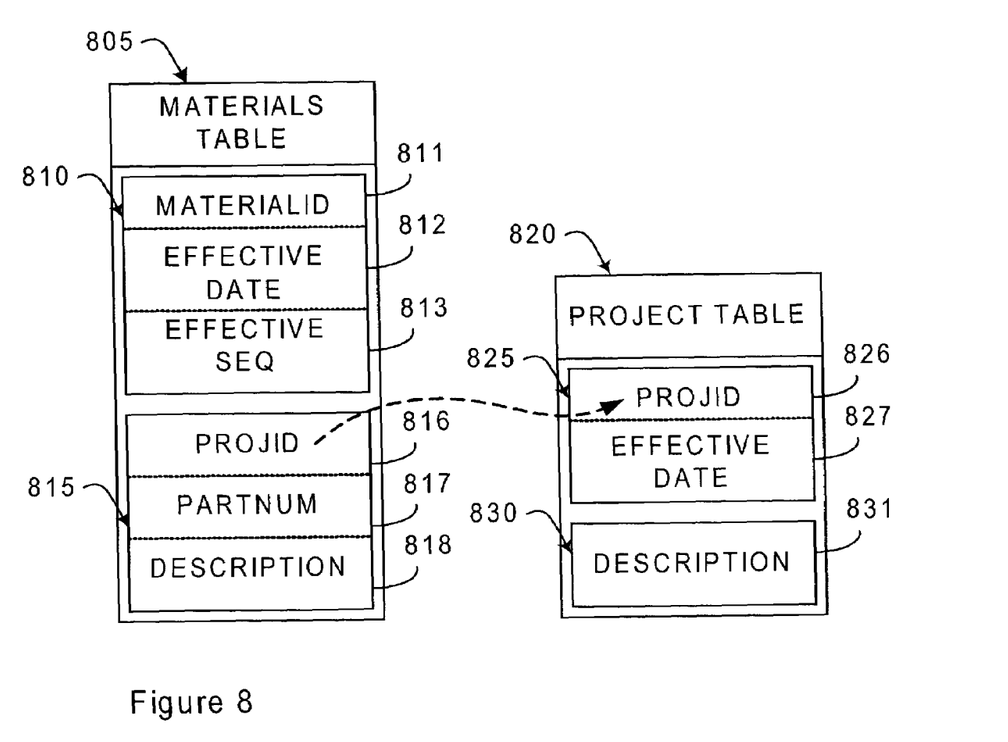
FIG. 8 is a diagram of two effective-dated data tables for use in a database containing information regarding a bill of materials.

With reference now to FIG. 8, there is shown a diagram illustrating a pair of data tables 805 and 820 for use in a database for maintaining information about materials in a bill of material, according to a preferred embodiment of the present invention. The first table 805 can be referred to as a materials table and contains information about a material (or product) that is part of a bill of materials and the second table 820 can be referred to as a project table and contains information about specific projects that will use a specific material. Both tables can be indexed by the effective date.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for merging data entries comprising:
converting data entries from a first table into continuous duration data entries;
merging adjacent continuous duration data entries containing similar data;
creating an association between a continuous duration data entry and a data entry in a second table, the data entry in the second table having an effective date within a time spanned by the continuous duration data entry; and using said association, to access at least one of said continuous duration data entry and said data entry.

2. The method of claim 1, wherein the data entries from the first table are stored in chronological order, and the converting comprises:

creating a continuous duration data entry;

storing an effective date from a data entry being convened as a start date of the continuous duration data entry; and storing an effective date from a data entry adjacent to the data entry being converted as a stop date of the continuous duration data entry.

3. The method of claim 2 further comprising after the second storing, storing any remaining data from the data entry being converted in the continuous duration data entry.

4. The method of claim 2, wherein the data entries are stored in increasing chronological order, and wherein the data entry adjacent to the data entry being converted has an effective date that is not earlier than the effective date of the data entry being converted.

5. The method of claim 1, wherein the merging comprises:

comparing two adjacent continuous duration data entries; and creating a merged continuous duration data entry if the two adjacent continuous duration data entries contain similar data.

6. The method of claim 5, wherein the two adjacent continuous duration data entries are merged if they contain essentially the same data in pre-determined fields.

7. The method of claim 6, wherein the two adjacent continuous duration data entries are merged if they contain the same data.

8. The method of claim 1, wherein the creating comprises:

splitting the continuous duration data entry into a first continuous duration data entry and a second continuous duration data entry;

setting a stop date entry of the first continuous duration data entry to the effective date of the data entry;

setting a start date entry of the second continuous duration data entry to the effective date of the data entry; and wherein the continuous duration data entry can be readily accessed by data stored in the second continuous duration data entry.

9. The method of claim 8, wherein the creating further comprises after the second setting, copying any remaining data from the continuous duration data entry into the first and second continuous duration data entries.

10. The method of claim 8, wherein the first and second continuous duration data entries are placed into a list of continuous duration data entries that have to be checked for associations with data entries in a second table.

11. The method of claim 1 further comprising prior to merging, eliminating continuous duration data entries containing data considered irrelevant under predetermined criteria.

12. The method of claim 11, wherein the eliminating comprises deleting the continuous duration data entries containing the data considered irrelevant under predetermined criteria.

13. A method for extracting data from effective-dated tables comprising:

converting data entries from a first table into continuous duration data entries;

merging adjacent continuous duration data entries containing similar data;

creating an association between a continuous duration data entry and a data entry in a second table, the data entry in the second table having an effective date within a time spanned by the continuous duration data entry;

searching the continuous duration data for a particular data entry received in a query;

proving a continuous duration data entry corresponding to the particular data entry if found; and using said association, to access at least one of said continuous duration data entry and said data entry.

14. The method of claim 13, wherein the data entries from a first table are stored in chronological order, and the converting comprises:

creating a continuous duration data entry;

storing an effective date from a data entry being converted as a start date of the continuous duration data entry; and storing an effective date from a data entry adjacent to the data entry being converted as a stop date of the continuous duration data entry.

15. The method of claim 13, wherein the merging comprises:

comparing two adjacent continuous duration data entries; and creating a merged continuous duration data entry if the two adjacent continuous duration data entries contain similar data.

16. The method of claim 13, wherein the creating comprises:

splitting the continuous duration data entry into a first continuous duration data entry and a second continuous duration data entry;

setting a stop date entry of the first continuous duration data entry to the effective date of the data entry; and setting a start date entry of the second continuous duration data entry to the effective date of the data entry.

17. The method of claim 13 further comprising prior to merging, eliminating continuous duration data entries containing data considered irrelevant under predetermined criteria.

18. The method of claim 13, wherein there are a plurality of queries received, and wherein the searching and providing are repeated for each query received.

19. The method of claim 13, wherein the converting, merging, and creating are repeated if a new data entry is added to an effective-dated table.

20. The method of claim 13, wherein the converting, merging, and creating are repeated if an existing data entry is modified.

21. The method of claim 13, wherein the data in the effective-dated tables relates to data in a human resources database system.

22. The method of claim 13, wherein the data in the effective-dated tables relates to data in a bill of materials database system.

23. The method of claim 13, wherein the data in the effective-dated tables relates to documents in a revision control system.

* * * * *